July 3, 1945.   B. TREVOR   2,379,765
ANGLE MODULATED WAVE RESONANCE INDICATOR
Filed May 13, 1943

Inventor
BERTRAM TREVOR
H. S. Snover
Attorney

Patented July 3, 1945

2,379,765

UNITED STATES PATENT OFFICE 2,379,765

ANGLE MODULATED WAVE RESONANCE INDICATOR

Bertram Trevor, Riverhead, N. Y., assignor to Radio Corporation of America, a corporation of Delaware Application May 13, 1943, Serial No. 486,775

9 Claims. (Cl. 250—40)

My present invention relates to resonance indicator circuits for radio communication systems, and more particularly to a tuning indicator device for a receiver of angle modulated carrier waves.

In the past there have been proposed various devices for indicating the tuning condition of radio receivers adapted to be responsive to angle modulated carrier wave energy. The generic term "angle modulated carrier wave energy" is meant to include frequency modulated (referred to hereinafter as "FM" for brevity) and phase modulated (referred to hereinafter as "PM" for brevity) carrier wave energy. These tuning devices are visual indicators for aiding the operator of receivers of this type in adjusting the selector circuits of the receiver to be accurately tuned to the carrier frequency of a given transmitter. By virtue of the inherent S-shaped characteristic of the demodulator of such a receiver accurate tuning by ear is very difficult. The tuning indicators that have been employed have either used special circuits, often complicated, or they have employed indicator tubes of a relatively unique type.

It is one of the main objects of my present invention to provide resonance indicators for receivers of angle modulated carrier wave energy, and more particularly to provide resonance indicators employing electron discharge tubes of conventional and readily replaceable types.

In the operation of resonance indicator tubes for frequency modulated carrier wave energy it is important that the indicator tube be sensitive to a wide range of changes in intensity and/or detuning of the received waves. It is desirable to have the visual responses on the indicating device show clearly small frequency deviations from a correct tuning position.

It may, therefore, be stated that it is an important object of this invention to provide a circuit for controlling a resonance indicator tube of an FM receiver, wherein the control circuit utilizes alternating current to provide a substantial balanced output to indicate accurate tuning of the receiver, whereas the balanced output of the control circuit is upset upon any detuning of the receiver.

Another important object of this invention is to provide a resonance indicator tube of the fluorescent target type, and to vary the electronic shadow on the target in response to detuning of an FM receiver from a predetermined mean frequency value representative of accurate tuning, the voltage generated during detuning being utilized to control the normally balanced output of an alternating current circuit.

Another object of my present invention is to provide a visual tuning indicator system for an FM radio receiver; the FM detector output being employed to control the relative potentials of a pair of alternating current-energized grids of a tube whose output circuit controls the voltage of the control grid of an indicator tube.

Still other objects of my invention are to improve generally the efficiency, sensitivity and replaceability of tuning indicator tubes for FM receivers, and more especially to provide an FM resonance indicator circuit which is economically manufactured and assembled.

The novel features which I believe to be characteristic of my invention are set forth with particularity in the appended claims; the invention itself, however, as to both its organization and method of operation will best be understood by reference to the following description, taken in connection with the drawing, in which I have indicated diagrammatically several circuit organizations whereby my invention may be carried into effect.

Figure 1:
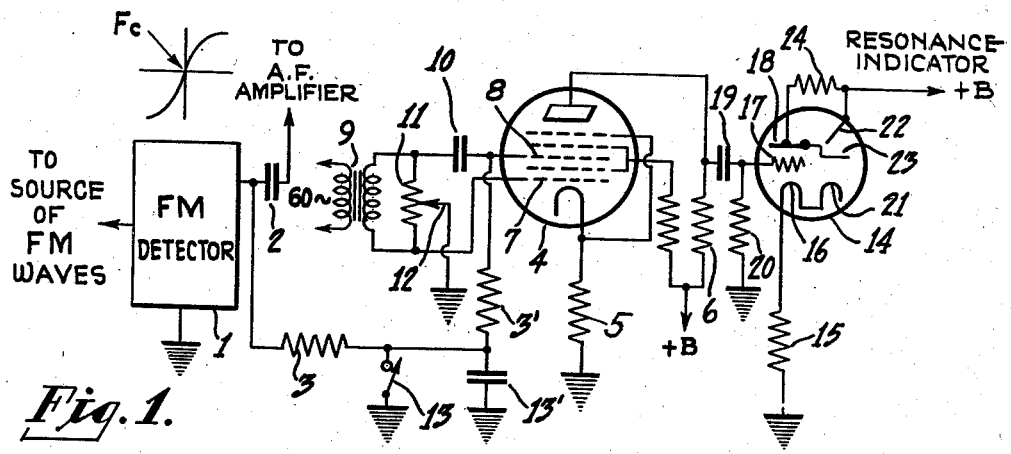
Fig. 1 shows the circuit diagram of one embodiment of the invention.

Referring now to the accompanying drawing, wherein like reference characters in the different figures designate similar circuit elements, it will be understood that my invention may be considered as generally applicable to indicate the resonance condition of any source of angle modulated carrier wave energy. For the purpose of specific illustration let it be assumed that the numeral 1 designates schematically the FM detector circuit of an FM radio receiver. Those skilled in the art are fully acquainted with the manner of constructing an FM receiver. At the present time the superheterodyne receiver is universally employed for FM reception. There are several assigned FM reception bands. The FM broadcast reception band covers a range of 42—50 megacycles (Mc.) Of course, my invention is not limited to any particular frequency band.

Let it be assumed for the purposes of this case that the FM detector 1 is utilized in an FM broadcast receiver system operating in the 42—50 Mc. range. The detector may be of the type disclosed and claimed by S. W. Seeley in his U. S. Patent No. 2,121,103, granted June 21, 1938. It is sufficient to point out that across the output terminals of the detector 1 there will be developed audio voltages corresponding to the original audio modulation signals which were applied to the carrier wave at the FM transmitter. The condenser 2 may be considered as the usual audio coupling condenser which feeds the audio signal voltage to a subsequent audio frequency amplifier of any desired construction. The audio amplifier will be terminated by any form of reproducer device.

As stated heretofore, it is difficult to tune an FM receiver by ear. This is due to the inherent S-shaped characteristic of the detector circuit depicted above the latter. Unless the tuning mechanism of the receiver has been adjusted to vary the tuning of each receiver selector circuit to the precise midband frequency of a given FM station there will be produced distortion at the loud speaker. This is readily understood when it is noted that the signal energy applied to the input terminals of the FM detector 1 must have a midband, or center, frequency Fc exactly equal to the predetermined midband frequency of the detector input circuit to provide an undistorted output across the detector output terminals. Accordingly, visual current indicators have been provided to aid the operator in tuning the receiver to the midband frequency of each desired FM station.

My present tuning indicator circuit provides an improvement in known indicator systems. Its particular merit resides in the fact that it employs readily available tubes thereby permitting easy replacement when tubes are to be replaced. Furthermore, the resonance indicator is rendered highly sensitive by the circuit now to be described. Generally, I utilize the direct current voltage component of the detected output of the detector 1. This direct current voltage component, or more generally the unidirectional voltage component, is derived from the detector output terminals by passing the detected current through a filter resistor 3. The direct current voltage component is applied to either of two spaced grids of an alternating current amplifier tube 4. The tube 4 may be a pentagrid tube of the 6SA7 type. Its cathode is connected to ground through a biasing resistor 5. Its plate is connected to the +B terminal of the direct current supply source through resistor 6. Its screen grid electrodes, which are the second and fourth grids, are connected to the +B terminal through a resistor of proper magnitude.

The resistor 6 functions as the plate load resistor of tube 4. The first and third grids are designated by numerals 7 and 8 respectively, and they are connected to the opposite ends of the secondary winding of transformer 9. The grid 8 is coupled to the upper end of the secondary winding of transformer 9 by a direct curent blocking condenser 10. The secondary winding is, furthermore, shunted by the potentiometer 11 whose adjustable slider 12 is connected to ground. The primary winding of transformer 9 is shown connected to a source of low frequency alternating current. Merely by way of illustration it is pointed out that the alternating current source may have a frequency of 60 cycles.

The potentiometer slider 12 is adjusted normally so that with the switch 13, which is shunted from the right-hand end of resistor 3 to ground, closed there will be proper magnitudes and opposite polarities of alternating current voltage applied to grids 7 and 8 such that there will be no alternating current voltage developed across the plate output resistor 6. After the proper balancing point for slider 12 has been secured the switch 13 may be opened. The direct current voltage component applied through resistor 3 is impressed upon the grid 8 through a further filter resistor 3'. The lower end of the latter is shunted to ground by the filter condenser 13'. The presence of direct current voltage in the output circuit of the detector 1 will be manifested in the output circuit of tube 4 by virtue of the fact that the voltage is applied to grid 8, and causes unbalancing. This means that alternating current voltage will be developed across output resistor 6.

The change from a balanced alternating output circuit to an unbalanced output circuit is visually indicated by means of the resonance indicator tube 14. This tube may be of the well known 6E5 type. Since this type of tube is very well known to those skilled in the art, it is only generally described. It comprises a pair of cathode sections 16 and 21 having a common connection to ground through a biasing resistor 15. One of the cathode sections 16 supplies electrons to a grid 17 and a plate 18. The section comprising electrodes 16, 17 and 18 functions as an alternating current voltage amplifier section. The alternating current voltage developed across resistor 6 is applied to grid 17 through the coupling condenser 19. The resistor 20 acts as a direct current return path to ground from grid 17.

The cathode section 21 provides electrons to an inverted conical fluorescent target 22. The target 22 has provided on its fluorescent surface an electronic shadow sector. This electronic shadow is provided by a control rod 23 which is directly connected to the plate 18. By the term "electronic shadow" is meant a non-luminous zone produced on a sector of the luminescent target face by the control rod 23 by virtue of deflection of electrons from that sector. The non-luminous zone indicates an absence of electrons, and thereby simulates a condition wherein it can be said that the rod 23 casts a shadow on an otherwise luminous target face. The plate 18 and the target 22 are connected together by a resistor 24, the right-hand end of which is connected to a point of proper positive direct current voltage. In this way, the plate 18 is at a less positive potential than target 22. The rod 23 will, of course, follow the positive potential variations of plate 18, and thereby will vary the area of the electronic shadow produced on target 22.

As is well known to those skilled in the art, there will be a maximum flow of space current through resistor 24 when grid 17 is most positive with respect to the cathode 16. By virtue of this space current flow through resistor 24 the control rod 23 has minimum positive potential with respect to target 22. Hence, it will provide a maximum area of electron shadow on the viewing face of the fluorescent target 22. The rod 23 actually deflects electrons in accordance with its potential. Should the grid 17 become increasingly negative, then the space current flow through resistor 24 would be reduced. As a result, the control rod 23 will increase in positive potential, and, therefore, will deflect the electrons from the cathode section 21 to a lesser extent. This means that the electron shadow on target 22 is narrowed.

Figure 2A:
Fig. 2a illustrates the appearance of the fluorescent target of the indicator tube for the in-tune condition.
Figure 2B:
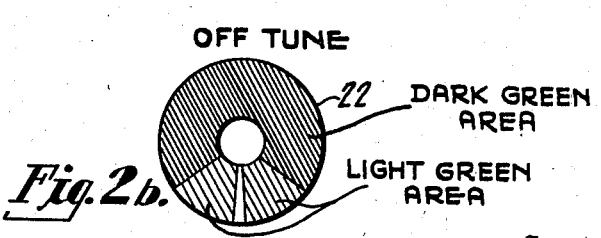
Fig. 2b shows the target for the off-tune condition.

In Fig. 2a I have shown the wide shadow angle produced when the grid 17 has its least negative potential. In Fig. 2b the narrower shadow angle is produced when the grid 17 has its maximum negative potential. The direct current voltage produced in the output circuit of the FM detector 1 is substantially zero when the receiver is accurately tuned to the midband frequency of the received station. It follows that the magnitudes of the alternating current voltages on grids 7 and 8 will have equal and opposite effects on the electron stream flowing to the plate of tube 4. Therefore, the alternating component of plate voltage across resistor 6 will be zero for the case of accurate tuning of the receiver.

However, if the receiver is adjusted off-tune with the received station carrier frequency, then there will be produced a direct voltage in the output circuit of detector 1. This direct current voltage will affect the voltage of grid 8, and thus unbalance the alternating current output circuit of tube 4. As a result there will be developed an alternating current voltage across resistor 6 which is applied to grid 17 thereby to increase and decrease its negative potential in accordance with the variations from transformer 9. Hence, the electronic shadow of target 22 will be alternately narrowed and widened at a rapid rate thus indicating the off-tune condition of the receiver. It is pointed out that the direct current voltage from the detector will produce a "flutter" in the form of a light green area on the shadow angle of the target 22. This flutter occurs at a rapid rate, and the effect on the human eye is an effective narrowing of the shadow angle. When the discriminator unbalances tube 4, the 60 cycle voltage applied to the tuning tube varies the shadow angle at a 60 cycle rate. This might be called a 60 cycle flutter of the shadow angle. Since the human eye cannot follow such rapid variations the resultant appearance is an effective narrowing of the shadow angle. The self-bias resistor 15 of tube 14 gives partial closing of the shadow in the absence of applied alternating voltage to grid 17. This is the in-tune condition. For the off-tune condition voltage is applied to grid 17 alternately opening and closing the shadow angle at a 60 cycle rate, giving the appearance shown in Fig. 2b.

Figure 3:
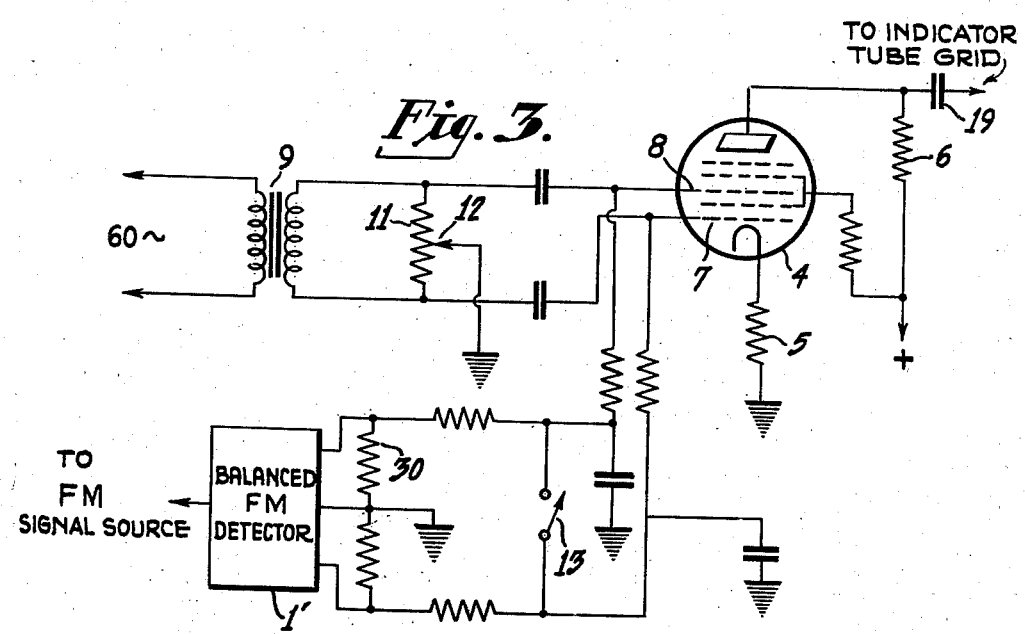
Fig. 3 shows a modified form of the circuit of Fig. 1.

If desired, the tube 4 can be fed with direct current voltage from a balanced FM detector circuit 1' as shown in Fig. 3. The latter may be of the type disclosed by me in my co-pending application Serial No. 418,927, filed November 13, 1941. In this form of balanced detector circuit the output load resistor 30 has its midpoint grounded, and its opposite ends are of positive and negative voltages respectively for the off-tune condition. For accurate tuning of the receiver the opposite ends of the load resistor 30 are of equal voltage magnitudes and near ground potential. Hence, electron control elements connected to these opposite ends of resistor 30 will allow tube 4 to be balanced as before for the in-tune condition. An off-tune condition will unbalance tube 4 giving an alternating current voltage applied to the grid 17, thus effectively narrowing the shadow angle. Appropriate filter resistors are inserted in series between each end of resistor 30 and its respective control grid of tube 4.

The switch 13 is connected in shunt across load resistor 30. The 60 cycle alternating current voltage is transmitted through a transformer 9, and the balancing potentiometer 11—12 functions in precisely the same manner as described in Fig. 1. The circuit of Fig. 3 functions in exactly the same manner as described in connection with Figs. 1 and 2. The only difference in the operation is that for mistuning of the receiver system the grids 8 and 7 are of different voltages thereby causing unbalancing of the alternating current circuit.

It is not necessarily correct that the alternating voltages applied to grids 7 and 8 should be equal, but they are required to be of such magnitude and opposite polarity that their effect on the plate current is equal and opposite. This is the condition for giving no voltage across resistor 6. If grids 7 and 8 had identical control characteristics then the applied alternating voltages would be equal and opposite. In the tube described, grids 7 and 8 do not have identical characteristics.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. In combination with a resonance indicator tube for a frequency modulation receiver, a control circuit having input terminals upon which is applied alternating current voltage, means in the control circuit normally balanced with respect to the applied alternating current voltage, means for producing an alternating control voltage in response to said first means becoming unbalanced relative to the applied voltage means responsive to the control voltage for regulating visual indications of said indicator tube, and additional means responsive to changes in the resonance condition of the receiver and applying a control voltage to one of said input terminals in a sense to disturb the balance of said electronic means.

2. In a frequency modulation radio receiver provided with a detector circuit and a visual tuning indicator, an improvement which includes an electron discharge tube provided with a pair of control electrodes and an output circuit, means applying alternating current voltages of opposite polarities respectively to said control electrodes, means responsive to an alternating voltage produced in said tube output circuit in response to said applied voltages regulating the indicative effect of the visual tuning indicator, and additional means responsive to the detector output voltage differentially controlling the voltages of said control electrodes.

3. In combination with a source of frequency-variable, high frequency energy, a detector provided with an input circuit tuned to a predetermined frequency equal to the mean frequency of said energy, a visual resonance indicator tube of the type provided with a fluorescent target, an electron discharge device provided with at least two spaced control grids, a source of low frequency alternating current voltage energizing the spaced grids, means responsive to the differential effect of said grids on the electron stream of said device for producing an alternating voltage for control of the indicative effect of the indicator tube, means to apply the control voltage to said indicator tube and means responsive to the detector output for differentially controlling the voltages of said spaced control grids.

4. In combination with a resonance indicator tube for an angle modulation receiver, a control circuit having input terminals upon which is applied low frequency alternating current voltage, electronic means in the control circuit normally balanced with respect to the applied alternating current voltage, voltage producing means responsive to the electronic means becoming unbalanced relative to the applied voltage for regulating visual indications of said indicator tube, and additional means responsive to changes in the resonance condition of the receiver and applying a control voltage to one of said input terminals in a sense to disturb the balance of said electronic means.

5. In an angle modulated wave receiver provided with a detector circuit and a visual tuning indicator tube, the improvement which includes a control tube provided with a pair of spaced control electrodes, means applying alternating current voltages of opposite polarities respectively to said control electrodes, an impedance in the space current path of said control tube for producing a control voltage in response to the differential effect of said alternating voltages, means responsive to said control voltage regulating the indicative effect of said visual tuning indicator, and additional means responsive to the detector output voltage differentially controlling the voltages of said control electrodes.

6. In combination with a source of frequency modulated wave energy, a detector provided with an input circuit tuned to a predetermined input frequency equal to the mean frequency of said energy, a visual tuning indicator tube of the type provided with a fluorescent target, an electron discharge device provided with at least two spaced control grids, a source of low frequency alternating current voltage for enerizing the spaced grids, a resistor in the space current path of the electron device to produce an alternating control voltage in response to the differential effect of said grids, means responsive to said control voltage altering the indicative effect of said indicator tube, and means responsive to the detector output differentially controlling the voltages of said spaced control grids.

7. In combination with a source of unidirectional voltage of variable polarity and magnitude, an indicator tube for visually indicating the voltage variations, a source of alternating voltage, a control tube having at least two control elements, means to apply the alternating voltage to the elements in relative polarities and magnitudes to provide a normal balanced effect on the electron stream of the control tube, an impedance in the space current path of the control tube for developing an alternating component in response to the voltages of said elements becoming unbalanced, means responsive to said component for altering the indicative operation of said indicator tube, and means for applying said variable voltage to at least one of said control elements to control the relative effect of the control elements on said electron stream.

8. In combination with a source of voltage of variable intensity, a visual voltage indicator comprising a tube provided with an electron emitter, an electron-responsive luminescent target and an electron control electrode, a space current device, said device being provided with at least two control elements, means for applying alternating voltages to said elements in such relative polarities and intensities as normally to have a balancing effect on the space current of the device, means applying said variable voltage to at least one of said control elements of the device thereby to upset said balancing effect, means in the space current path of the device for providing an alternating voltage component in response to said upset, and means to vary the potential of said control electrode in response to said component thereby to provide a relatively non-luminous zone of fluctuating area on said target.

9. In combination with a source of voltage of variable intensity, a visual voltage indicator comprising a tube provided with an electron emitter, an electron-responsive luminescent target and an electron control electrode, a space current device, said device being provided with at least two control elements, means for applying alternating voltages to said elements in such relative polarities and intensities as normally to have a balancing effect on the space current of the device, means applying said variable voltage to at least one of said control elements of the device thereby to upset said balancing effect, means in the space current path of the device for providing an alternating voltage component in response to said upset, and means to vary the potential of said control electrode in response to said component thereby to provide a relatively non-luminous zone of fluctuating area on said target, means for selectively rendering said variable voltage applying means ineffective, and means associated with said alternating voltage applying means for adjusting the alternating voltage relations between said control elements.

BERTRAM TREVOR.